(12) United States Patent
Adam et al.

(10) Patent No.: US 8,363,557 B2
(45) Date of Patent: Jan. 29, 2013

(54) METHODS, SYSTEMS, AND COMPUTER READABLE MEDIA FOR REMOTELY EVALUATING AND CONTROLLING VOICE OVER IP (VOIP) SUBSCRIBER TERMINAL EQUIPMENT

(75) Inventors: Richard L. Adam, Lancaster, CA (US); Rex Hester, Bear Creek, NC (US); Carl Mottayaw, Bellefontaine, OH (US); Richard Van Schaik, Galena, OH (US)

(73) Assignee: Ixia, Calabasas, CA (US)

( * ) Notice: Subject to any disclaimer, the term of this patent is extended or adjusted under 35 U.S.C. 154(b) by 158 days.

(21) Appl. No.: 12/475,451

(22) Filed: May 29, 2009

(65) Prior Publication Data

US 2010/0266106 A1 Oct. 21, 2010

Related U.S. Application Data

(60) Provisional application No. 61/170,456, filed on Apr. 17, 2009.

(51) Int. Cl.
*H04L 12/26* (2006.01)
(52) U.S. Cl. .................................. 370/249; 379/27.01
(58) Field of Classification Search .............. 370/351, 370/352, 241, 249; 379/1.01, 27.01
See application file for complete search history.

(56) References Cited

U.S. PATENT DOCUMENTS

| | | | |
|---|---|---|---|
| 7,352,705 | B1 | 4/2008 | Adhikari et al. |
| 7,706,264 | B2 | 4/2010 | Lai et al. |
| 7,835,293 | B2 | 11/2010 | Cidon et al. |
| 7,849,177 | B2 | 12/2010 | Uhlik |
| 8,081,578 | B2 | 12/2011 | Adam et al. |
| 8,156,098 | B1 | 4/2012 | Landsman et al. |
| 8,165,572 | B1 | 4/2012 | Kirchhoff et al. |
| 2002/0145979 | A1 | 10/2002 | Baj |

(Continued)

FOREIGN PATENT DOCUMENTS

| | | |
|---|---|---|
| JP | 2005-129981 A | 5/2005 |
| KR | 10-2008-0073006 A | 8/2008 |

(Continued)

OTHER PUBLICATIONS

Notification of Transmittal of the International Search Report and the Written Opinion of the International Searching Authority, or the Declaration for International Application No. PCT/US2010/020394 (Aug. 16, 2010).

(Continued)

*Primary Examiner* — Dang Ton
*Assistant Examiner* — Kevin Lee
(74) *Attorney, Agent, or Firm* — Jenkins, Wilson, Taylor & Hunt, P.A.

(57) ABSTRACT

Methods, systems, and computer readable media for remotely evaluating and controlling VoIP subscriber terminal equipment using test calls, status queries, and usage statistics are disclosed. In one embodiment, a method includes initiating test calls with VoIP subscriber terminal equipment and obtaining test call results. The method further includes analyzing usage information regarding the VoIP subscriber terminal equipment and determining subscriber terminal device usage results. The method also includes remotely querying the VoIP subscriber terminal device and determining subscriber terminal equipment state information. The method further includes determining, based on the subscriber terminal equipment test call results, the subscriber terminal equipment usage results, and the subscriber terminal equipment state information, whether to initiate a remote control action for the VoIP subscriber terminal equipment and in response to determining to initiate a remote control action, initiating the remote control action to effect a change in state of the VoIP subscriber terminal equipment.

16 Claims, 2 Drawing Sheets

U.S. PATENT DOCUMENTS

| | | | |
|---|---|---|---|
| 2003/0093513 A1 | 5/2003 | Hicks et al. | |
| 2004/0151127 A1 | 8/2004 | Chong | |
| 2006/0114920 A1 | 6/2006 | Jung et al. | |
| 2007/0011145 A1 | 1/2007 | Snyder | |
| 2007/0011725 A1 | 1/2007 | Sahay et al. | |
| 2007/0147354 A1* | 6/2007 | He | 370/352 |
| 2007/0177615 A1 | 8/2007 | Miliefsky | |
| 2008/0031425 A1 | 2/2008 | Glynn et al. | |
| 2008/0102809 A1 | 5/2008 | Beyer | |
| 2008/0184260 A1 | 7/2008 | Grayson | |
| 2008/0195461 A1 | 8/2008 | Li et al. | |
| 2009/0046636 A1 | 2/2009 | Kwak | |
| 2009/0060495 A1* | 3/2009 | Wurst et al. | 398/16 |
| 2009/0243517 A1* | 10/2009 | Verfuerth et al. | 315/315 |
| 2009/0245118 A1 | 10/2009 | McCormick | |
| 2009/0268713 A1 | 10/2009 | Ottur et al. | |
| 2010/0172246 A1 | 7/2010 | Adam et al. | |
| 2010/0172251 A1 | 7/2010 | Adam et al. | |

FOREIGN PATENT DOCUMENTS

| | | |
|---|---|---|
| WO | WO 2010/080926 A1 | 7/2010 |
| WO | WO 2010/080927 A2 | 7/2010 |
| WO | WO 2010/080930 A2 | 7/2010 |

OTHER PUBLICATIONS

Notification of Transmittal of the International Search Report and the Written Opinion of the International Searching Authority, or the Declaration for International Application No. PCT/US2010/020391 (Aug. 13, 2010).

Notification of Transmittal of the International Search Report and the Written Opinion of the International Searching Authority, or the Declaration for International Application No. PCT/US2010/020390 (Aug. 13, 2010).

"Series P: Telephone Transmission Quality, Telephone Installations, Local Line Networks; Methods for Objective and Subjective Assessment of Quality; Perceptual Evaluation of Speech Quality (PESQ): An Objective Method for End-to-End Speech Quality Assessment of Narrow-Band Telephone Networks and Speech Codecs," ITU-T P3862 (Feb. 2001).

Notice of Allowance and Fee(s) Due for U.S. Appl. No. 12/395,657 (Aug. 17, 2011).

Official Action for U.S. Appl. No. 12/395,657 (Apr. 14, 2011).

Official Action for U.S. Appl. No. 12/406,912 (May 24, 2012).

* cited by examiner

METHODS, SYSTEMS, AND COMPUTER READABLE MEDIA FOR REMOTELY EVALUATING AND CONTROLLING VOICE OVER IP (VOIP) SUBSCRIBER TERMINAL EQUIPMENT

PRIORITY CLAIM

This application claims the benefit of U.S. Provisional Patent Application No. 61/170,456, filed Apr. 17, 2009, the disclosure of which is incorporated herein by reference in its entirety.

TECHNICAL FIELD

The subject matter described herein relates to subscriber terminal equipment. More specifically, the subject matter relates to methods, systems, and computer readable media for remotely evaluating and controlling VoIP subscriber terminal equipment.

BACKGROUND

Various forms of communication are possible through packet-based networks, including data and voice. For example, voice over Internet protocol (VoIP) implementations enable voice traffic, such as telephone calls, to be carried over Internet protocol (IP) communications networks. This allows voice calls to use the reduced transmission cost associated with packet switched networks to carry information once exclusively carried over more expensive conventional circuit switched networks. For example, during a VoIP call, the voice signal from a user is compressed and packetized using one or more of a variety of applicable protocols so as to be suitable for being transmitted using a packet switched communications network to a called party. When the VoIP packets are received at their destination, the voice signal is decompressed before being played to the called party.

VoIP subscribers interface with the VoIP network using VoIP subscriber terminal equipment. VoIP subscriber terminal equipment may include cable modems, digital subscriber line (DSL) modems, set-top boxes, multimedia terminal adapters (MTAs), analog telephony adapters (ATAs), wireless or wireline phones incorporating ATAs or MTAs, or any like component (e.g., ADSL modems, SDSL modems, optical modems, ATM modems, wireless modems, etc.) including other terminal adapters. These subscriber devices are an integral part in providing content and communications to and between subscribers.

While service providers strive to avoid problems that affect subscribers' service, problems sometimes arise. At these times, it may be helpful to reset or change the settings of an affected subscriber's terminal equipment. Conventionally, the ability to remotely diagnose and correct problems associated with subscriber terminal equipment has been limited. For example, when a subscriber experiences a problem with his or her subscriber terminal equipment, the subscriber is required to identify the problem and to call (using an alternate device) the VoIP service provider. The VoIP service provider may then instruct the subscriber to manually reset the subscriber terminal equipment in order to clear the problem. In extreme cases, the VoIP service provider may be required to send a technician to the location of the subscriber terminal equipment to diagnose a problem. Requiring intervention by a technician and relying on the subscriber to identify problems results in dissatisfaction of VoIP service providers and ultimately, subscriber migration between service providers.

Accordingly, in light of these shortcomings, a need exists for methods, systems, and computer readable media for remotely evaluating and controlling VoIP subscriber terminal equipment.

SUMMARY

Methods, systems, and computer readable media for remotely evaluating and controlling VoIP subscriber terminal equipment using test calls, status queries, and usage statistics are disclosed. In one embodiment, a method includes initiating test calls with VoIP subscriber terminal equipment and obtaining test call results. The method further includes analyzing usage information regarding the VoIP subscriber terminal equipment and determining subscriber terminal device usage results. The method also includes remotely querying the VoIP subscriber terminal device and determining subscriber terminal equipment state information. The method further includes determining, based on the subscriber terminal equipment test call results, the subscriber terminal equipment usage results, and the subscriber terminal equipment state information, whether to initiate a remote control action for the VoIP subscriber terminal equipment and in response to determining to initiate a remote control action, initiating the remote control action to effect a change in state of the VoIP subscriber terminal equipment.

The subject matter described herein for remotely evaluating and controlling VoIP subscriber terminal equipment may be implemented using a computer readable medium having stored thereon executable instructions that when executed by a computer processor control the computer to performs steps. Exemplary computer readable media suitable for implementing the subject matter described herein includes disk memory devices, chip memory devices, programmable logic devices, and application specific integrated circuits. In one implementation, the computer readable medium may include a memory accessible by a processor. The memory may include instructions executable by the processor for implementing any of the methods for remotely controlling VoIP subscriber terminal equipment described herein. In addition, a computer readable medium that implements the subject matter described herein may be located on a single device or computing platform or may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
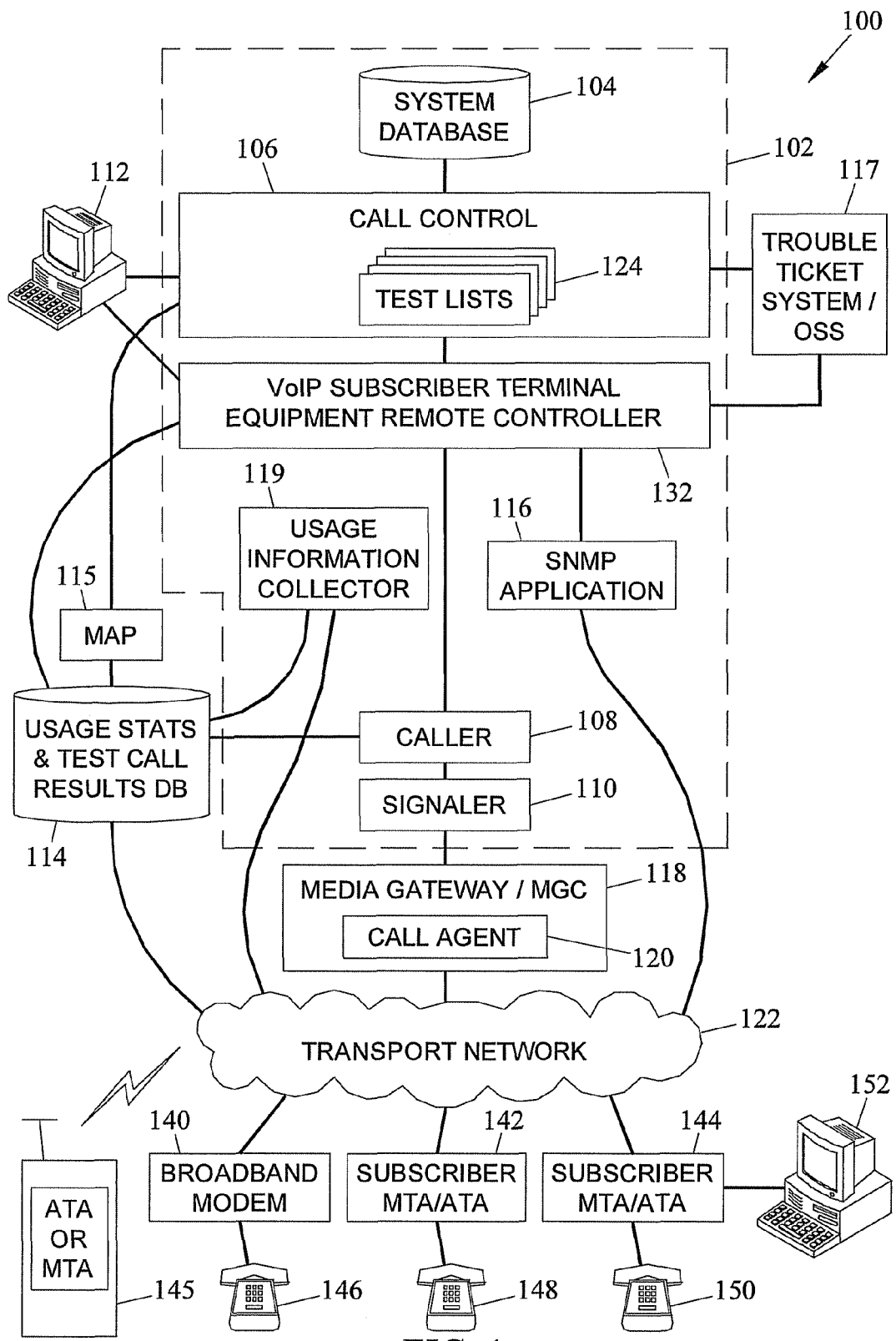
FIG. 1 is a block diagram of an exemplary system for remotely evaluating and controlling VoIP subscriber terminal equipment according to an embodiment of the subject matter described herein.

FIG. 1 depicts a telecommunications network 100 that includes a remote test and control system 102, a transport network 122, VoIP subscriber terminal equipment 140-145, and a plurality of endpoint devices 146-152. In the illustrated example, VoIP subscriber terminal equipment includes a broadband modem 140, a subscriber MTA or ATA 142 that interfaces with an analog phone 148, a subscriber MTA or ATA 144 that interfaces with an analog phone 150 and a personal computer 152, and a mobile phone 145 with an integrated MTA or ATA device. Remote test and control system 102 may be used by a communications service provider to generate and analyze test calls intended for testing the connections to VoIP subscriber terminal equipment 140-145 and to evaluate and remotely control VoIP subscriber terminal equipment 140-145 using these test calls results among other information. In one example, VoIP subscriber terminal equipment 140-145 may include the ability for a remote test center to implement loopback calls transparently to the end user. These loopback calls are initiated by remote test system 102. Once a call is established, remote test system 102 plays a media file over the established call and records the resulting signal detected over the loopback connection. In one implementation, the quality of the call is evaluated using a perceptional evaluation of speech quality (PESQ) store. A poor PESQ store in combination with other metrics will be described in more detail below may be used to trigger remote test and control system 102 to initiate a remote control action for voice over IP subscriber equipment 140-145. In one example, remote test and control system 102 may be implemented using a computer with one or more processors that are programmed with the applications, methods, and modules described herein for evaluating and controlling VoIP subscriber terminal equipment.

In the illustrated example, remote test and control system 102 includes a system database 104, a call control application 106, a VoIP subscriber terminal equipment remote controller 132, a caller application 108, and a signaler application 110. Remote test and control system 102 may also be communicatively coupled to a network operator interface 112, a usage information and test call results database 114, a trouble ticket system or operations support system (OSS) 117, and one or more external applications (e.g., a MAP application 115). Network operator interface 112 may include a computing device, such as a personal computer or personal digital assistant, for executing an application (e.g., software application, web browser, etc.) that can be used for communicating with remote test and control system 102. Trouble ticket system 117 may include a computing system that is configured to collect trouble tickets in telecommunications network 100. MAP application 115 may include an application that provides test call data and/or instructions for automated test call generation to system 102. Usage information and test call results database 114 may include any form of database supported by a host computer that is responsible for storing usage information and test call results of subscriber terminal equipment. In one embodiment, usage information that is collected and stored in database 114, may include call detail records (CDRs) associated with test calls of voice over Internet protocol (VoIP) subscriber terminal equipment (e.g., multimedia terminal adapters (MTAs) and analog telephony adapters (ATAs)). In another embodiment, usage information may include IP connection data statistics associated with subscriber terminal equipment including data modems. Subscriber terminal equipment is discussed in greater detail below. A usage information collector application 119 may interface with customer switches or a customer CDR database in transport network 122 and store that information in usage statistics and test call results database 114.

Remote test and control system 102 may also include a management application 116 that is capable of sending queries to and control commands to subscriber terminal equipment 140-145. In one implementation, management application 116 may be an SNMP application capable of sending SNMP queries and commands to subscriber terminal equipment 140-145.

Within remote test and control system 102, call control application 106 may be responsible for initiating the test call process. In one embodiment, call control application 106 contains a plurality of test lists 124. Each test list may comprise a plurality of subscriber device numbers (each of which includes a bit field that identifies the list(s) to which each subscriber device number is assigned). Each test list may include certain parameters that set forth the frequency (i.e., the call rate) in which its listed subscriber device numbers are test called, the specific start and stop times of periods which the test calls are made, the type of test call(s) to be made, as well as the conditions for a subscriber device number to be added to, deleted from, or remain on a test list. As described above, one type of test call that can be made is a loopback call to subscriber ATA or MTA equipment for recording and evaluation of a PESQ score. Test lists 124 may be stored in the memory accessible by call control application 106. Call control application 106 may be configured to receive call requests from test lists 124. In one embodiment, call control application 106 is configured to receive call requests from VoIP subscriber terminal equipment remote controller 132 which is discussed in greater detail below. Call control application 106 may also be responsible for ensuring that network resources are available for the requested test calls (e.g., ensuring that a daily test call limit is not exceeded). Images of test lists 124 may also exist in system database 104 for backup or reboot purposes. In one embodiment, system database 104 stores the test list and subscriber terminal equipment information which may be updated accordingly as changes occur in lists 124.

As previously discussed, remote test and control system 102 may utilize test lists to conduct test calls. In one embodiment, remote test and control system 102 initiates a test call to a subscriber device number via call control application 106. Specifically, call control application 106 may obtain test call requests, which include the subscriber device numbers from test lists 124. For each test list, call control application 106 is also configured to apply certain test list parameters, which are associated with each respective test list, to each test call directed to a subscriber device number during the test call initiation process. For example, the test parameters for each test list may include the type of test call to generate (e.g., loopback or continuity test), the frequency in which test calls are to be made, the specific start and stop times for test calling, the minimum or maximum number of test calls that can be made during a given time period, and other calling criteria that is unique to a given test list.

According to one embodiment, call control application 106 provides the subscriber device number and test parameters to caller application 108. Caller application 108 is a system component responsible for processing the call instructions and making a test call to a subscriber device number. In one embodiment, caller application 108 provides the subscriber device number to signaler application 110, which is the system component that provides the signaling for generating the test call. Signaler application 110 may include a software program or module that interacts with the network in order to direct the test call to the proper subscriber terminal adapter. In one embodiment, signaler application 110 communicates with media gateway/media gateway controller (MG/MGC) 118 via a signaling network and/or a TDM or packet voice network. Once a test call is generated by signaler application 110, the test call is received over voice trunks by the media gateway component of MG/MGC 118, which then directs the test call to a terminal adapter associated with the intended subscriber device number via transport network 122. Although MG/MGC 118 in FIG. 1 is shown as an external interface connecting transport network 122 to remote test and control system 102, MG/MGC 118 may be positioned within transport network 122 in an alternate embodiment. MG/MGC 118 may also include a call agent 120, which is responsible for processing call requests and setting up calls between the media gateway component of MG/MGC 118 and remote test and control system 102.

Once processed by MG/MGC 118, a test call traverses transport network 122 and is received by one of subscriber terminal equipment 140-145. As stated above, subscriber terminal equipment 140-145 may be configured to "loopback" the voice path so that the test call is returned to remote test and control system 102. The type of loopback procedure performed may depend on the terminal equipment receiving the test call or the test list originating the test call. For example, if the terminal adapter is an MTA, then the test call may comply with a network call signaling (NCS) loopback procedure. Similarly, if the terminal adapter is an ATA, then the test call may comply with an RTP loopback procedure. During the loopback procedure, the test call is received by caller application 108. It is important to note that the test call is transparent to the subscriber. Notably, the test call does not ring the subscriber device and has no effect on the subscriber's service, thereby allowing test calls to be made at any time of the day.

VoIP subscriber terminal equipment remote controller 132 may also initiate test calls to the subscriber terminal equipment. In one embodiment, VoIP subscriber terminal equipment remote controller 132 may inform call control application 106 to start the test call process. In another embodiment, VoIP subscriber terminal equipment remote controller 132 may also supply information about the subscriber terminal equipment to a test list which may be used by the call control application 106 to make test calls. In yet another embodiment, VoIP subscriber terminal equipment remote controller 132 may interact directly with caller application 108 to make test calls.

According to one embodiment, VoIP subscriber terminal equipment remote controller 132 analyzes and evaluates subscriber terminal equipment for problems (e.g., an abnormal state, connection problems, etc.) using test calls and test call results, equipment usage information, and state information from queries of the subscriber terminal equipment. VoIP subscriber terminal equipment remote controller 132 may determine, using the subscriber terminal equipment test call results, the subscriber terminal equipment usage results, and the subscriber terminal equipment state information, a problem or abnormal state exists and may determine to initiate a remote control action for the subscriber terminal equipment for fixing or alleviating the problem. In one embodiment, the remote control action may include sending a simple network management protocol (SNMP) reset command or request to the subscriber terminal equipment. If the remote control action is unable to be completed or unsuccessful at fixing the problem, VoIP subscriber terminal equipment remote controller 132 and or a network operator via network operator interface 112 may be notified at which time appropriate actions may be taken. For example, VoIP subscriber terminal equipment remote controller 132 may notify trouble ticket system or OSS 117 which may perform additional tests or actions before notifying a network operator. Once notified, a network operator may call an affected subscriber (on a secondary number if the primary number is affected by the subscriber's service problems) and inform the subscriber to perform appropriate actions manually or schedule a service technician to perform these actions for the subscriber. This remote control process is discussed in greater detail below.

Figure 2:
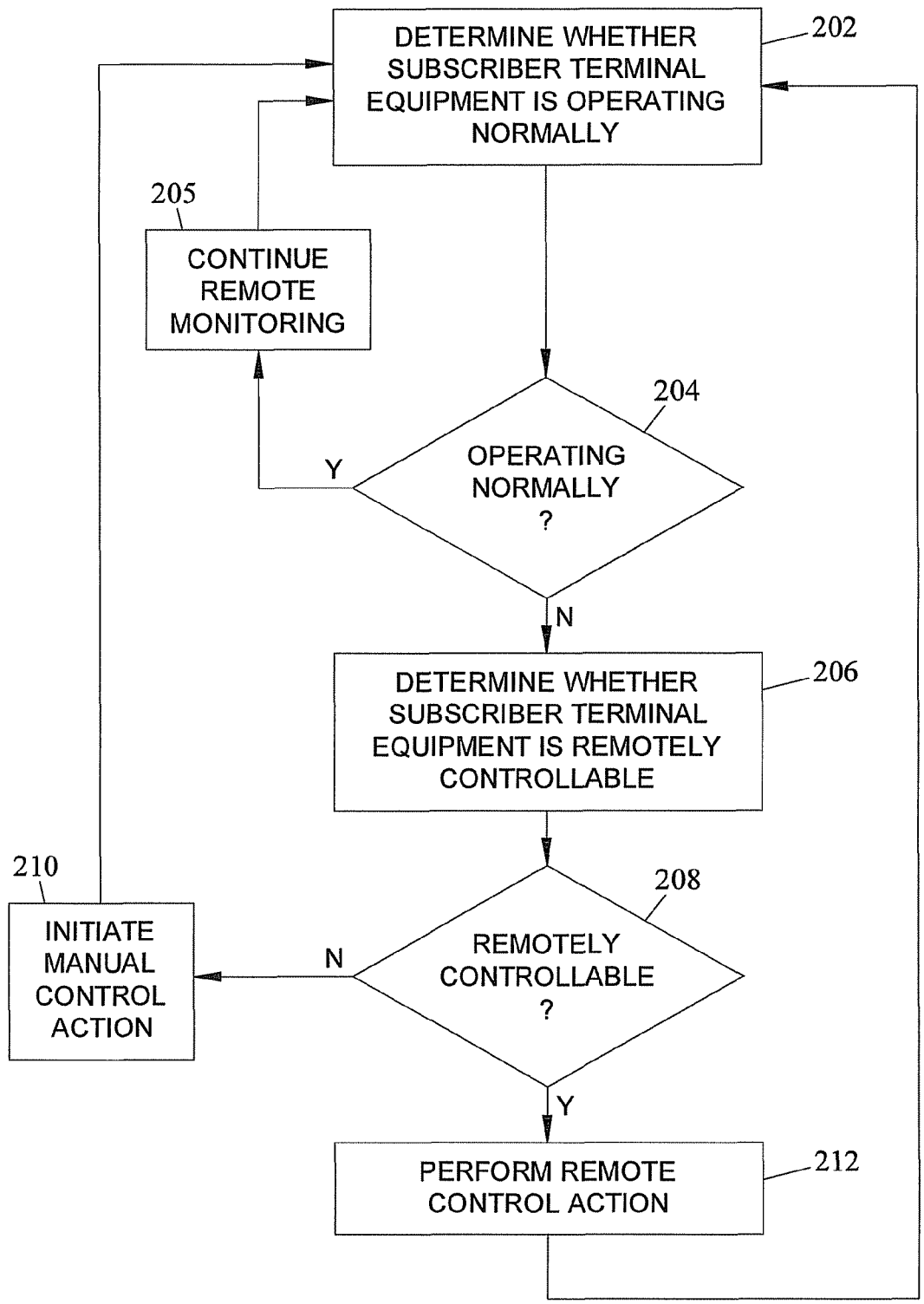
FIG. 2 is flow chart of exemplary steps for remotely evaluating and controlling VoIP subscriber terminal equipment according to an embodiment of the subject matter described herein.

FIG. 2 depicts a flow chart of an exemplary method 200 for remotely evaluating and controlling subscriber terminal equipment according to an embodiment of the present subject matter. Exemplary method 200 starts at block 202. In blocks 202 and 204, a determination is made as to whether VoIP subscriber terminal equipment is operating normally. In one embodiment, this determination includes initiating test calls with VoIP subscriber terminal equipment and obtaining test call results from database 114. Determining whether VoIP subscriber terminal equipment is operating normally may also include analyzing usage information regarding the VoIP subscriber terminal equipment and determining subscriber terminal equipment usage results. In one embodiment, the usage information includes call detail records (CDRs) for VoIP subscriber terminal equipment which may be obtained from database 114. In another embodiment, the usage information includes IP connection data statistics which may be obtained from database 114. Determining whether VoIP subscriber terminal equipment is operating normally may also include remotely querying the VoIP subscriber terminal equipment and determining subscriber terminal equipment state information. In one embodiment, VoIP subscriber terminal equipment remote controller 132 may direct management application 116 to send SNMP queries to the VoIP subscriber terminal equipment for determining state information. VoIP subscriber terminal equipment remote controller 132 may receive responses to the queries and use these responses or lack thereof to determine if the VoIP subscriber terminal equipment is experiencing problems (e.g., if the device is unavailable or in an abnormal state). If it is determined that the VoIP subscriber terminal equipment is operating normally, control proceeds to blocks 205 and 202 where monitoring is continued.

In block 206, it is determined whether the subscriber terminal equipment is remotely controllable. Determining whether the subscriber equipment is remotely controllable may include determining whether the subscriber terminal equipment responds to SMNP commands. If the subscriber terminal equipment is determined not to be remotely controllable, e.g., due to a power outage, control proceeds to block 210 where a manual control action is performed. A manual control action may include having a technician contact the subscriber to proactively (i.e., before subscriber contacts the VoIP service provider about the problem) resolve problems with the subscriber terminal equipment.

In block 208, if it is determined that the subscriber terminal equipment is remotely controllable, control proceeds to block 212 where a remote control action is performed. The remote control action may include sending an SMNP command to remotely reset, but not power down, the device. Once the remote control action is performed, control returns to block 202 where monitoring to determine whether the subscriber terminal equipment is acting normally is continued.

The procedure for monitoring and testing subscriber terminal equipment after a remote reset may vary from the monitoring of subscriber terminal equipment before a remote reset. For example, after a remote reset, an SMNP query may be initiated to the subscriber terminal equipment to determine whether the equipment is in a normal or abnormal state. If the device remains in an abnormal state, system 102 may notify the VoIP service provider and a manual control action may be performed, e.g., by contacting the subscriber via an alternate number and/or dispatching a technician. If the SMNP query indicates that the subscriber terminal equipment is in a normal state, a test call may be initiated to determine whether the equipment is operating normally. If the test call results indicate normal operation, remote monitoring may continue as illustrated by blocks 202-212 in FIG. 2. If the test call results indicate that the subscriber terminal equipment is not operating normally, system 102 may notify the VoIP service provider and a manual control action may be performed.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for remotely evaluating and controlling voice over IP (VoIP) subscriber terminal equipment, the method comprising:
   using a remote test and control system comprising at least one computer:
      initiating test calls with the VoIP subscriber terminal equipment and obtaining test call results, wherein initiating the test calls includes initiating loopback calls with the VoIP subscriber terminal equipment and wherein obtaining test call results includes obtaining results from a test that evaluates speech quality of the loopback calls;
      analyzing usage information regarding the VoIP subscriber terminal equipment and determining subscriber terminal equipment usage results;
      remotely querying the VoIP subscriber terminal equipment and determining subscriber terminal equipment state information;
      determining, based on the VoIP subscriber terminal equipment test call results, the VoIP subscriber terminal equipment usage results, and the VoIP subscriber terminal equipment state information, whether to initiate a remote control action for the VoIP subscriber terminal equipment; and
      in response to determining to initiate a remote control action, initiating the remote control action to effect a change in state of the VoIP subscriber terminal equipment, wherein initiating the remote control action to effect a change in state of the VoIP subscriber terminal equipment includes sending a simple network management protocol (SNMP) reset command to the VoIP subscriber terminal equipment.

2. The method of claim 1 comprising testing the VoIP subscriber terminal equipment after performing the remote control action to determine whether the remote control action was successful in changing the state of the VoIP subscriber equipment to a desired state.

3. The method of claim 1 wherein determining whether to initiate the remote control action includes determining whether the subscriber terminal equipment is remotely controllable.

4. The method of claim 1 wherein the remote control action includes a reset of the VoIP subscriber terminal equipment.

5. The method of claim 1 wherein analyzing the usage information includes analyzing call detail records (CDRs).

6. The method of claim 1 wherein analyzing the usage information includes analyzing Internet protocol (IP) connection data statistics.

7. The method of claim 1 wherein remotely querying the VoIP subscriber terminal equipment includes sending a simple network management protocol (SNMP) query to the VoIP subscriber terminal equipment.

8. The method of claim 1 wherein the VoIP subscriber terminal equipment includes one of: a cable modem, an analog telephony adapter (ATA) device, a multimedia terminal adapter (MTA) device, and a mobile phone with an integrated ATA or MTA device.

9. A remote control system for remotely evaluating and controlling voice over IP (VoIP) subscriber terminal equipment, the system comprising:
   a caller application for initiating test calls with the VoIP subscriber terminal equipment and obtaining test call results, wherein the caller application is configured to initiate loopback calls with the subscriber terminal equipment and to evaluate speech quality over the loopback calls;
   a usage information collector for obtaining usage information regarding the VoIP subscriber terminal equipment;
   a management application for remotely querying the VoIP subscriber terminal equipment and obtaining VoIP subscriber terminal equipment state information; and
   a VoIP subscriber terminal equipment remote controller for determining, based on the test call results, the usage information and the VoIP subscriber terminal equipment state information whether to initiate a remote control action, and, in response to determining to initiate the remote control action, initiating the remote control action to effect a change in state of the VoIP subscriber terminal equipment, wherein the remote control action to effect a change in state of the VoIP subscriber terminal equipment includes sending of a simple network management protocol (SNMP) reset command to the VoIP subscriber terminal equipment.

10. The system of claim 9 wherein the VoIP subscriber terminal equipment remote controller receives information that the remote control action has been performed on the VoIP subscriber terminal equipment, in response to the remote control action being performed on the VoIP subscriber terminal equipment, determines whether the subscriber device is currently operating normally, and if the subscriber device is not currently operating normally, notifies a network operator.

11. The system of claim 9 wherein the remote control action includes a reset of the VoIP subscriber terminal equipment.

12. The system of claim 9 wherein the usage information analyzed by the VoIP subscriber terminal equipment remote controller includes call detail records (CDRs).

13. The system of claim 9 wherein the usage information analyzed by the VoIP subscriber terminal equipment remote controller includes Internet protocol (IP) connection data statistics.

14. The system of claim 9 wherein the management application is configured to send simple network management protocol (SNMP) queries to the VoIP subscriber terminal equipment.

15. The system of claim 9 wherein the VoIP subscriber terminal equipment includes one of: a cable modem, an analog telephony adapter (ATA) device, a multimedia terminal adapter (MTA) device, and a mobile phone with an integrated ATA or MTA device.

16. A non-transitory computer readable medium having stored thereon computer executable instructions that when executed by a processor of a computer control the computer to perform steps comprising:
   initiating test calls with VoIP subscriber terminal equipment and obtaining test call results, wherein initiating the test calls includes initiating loopback calls with the VoIP subscriber terminal equipment and wherein obtaining test call results includes obtaining results from a test that evaluates speech quality of the loopback calls;

analyzing usage information regarding the VoIP subscriber terminal equipment and determining subscriber terminal equipment usage results;

remotely querying the VoIP subscriber terminal equipment and determining subscriber terminal equipment state information;

determining, based on the VoIP subscriber terminal equipment test call results, the VoIP subscriber terminal equipment usage results, and the VoIP subscriber terminal equipment state information, whether to initiate a remote control action for the VoIP subscriber terminal equipment; and in response to determining to initiate a remote control action, initiating the remote control action to effect a change in state of the VoIP subscriber terminal equipment, wherein initiating the remote control action to effect a change in state of the VoIP subscriber terminal equipment includes sending a simple network management protocol (SNMP) reset command to the VoIP subscriber terminal equipment.

* * * * *